United States Patent
Krommenhoek et al.

(10) Patent No.: US 8,707,774 B2
(45) Date of Patent: Apr. 29, 2014

(54) SENSOR SYSTEM FOR DIFFERENTIAL PRESSURE MEASUREMENT

(75) Inventors: Erik Eduard Krommenhoek, Enschede (NL); Frank Gerald Daniel Morsink, Aadorp (NL); Arnout Gerbrand van den Bos, Deurningen (NL); David J. DiPaola, Gaithersburg, MD (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 13/561,170

(22) Filed: Jul. 30, 2012

(65) Prior Publication Data
US 2012/0304752 A1 Dec. 6, 2012

(30) Foreign Application Priority Data
Aug. 1, 2011 (EP) .................................... 11176135

(51) Int. Cl.
*G01M 15/10* (2006.01)
(52) U.S. Cl.
USPC ........................................................ 73/114.76

(58) Field of Classification Search
USPC ........................................................ 73/114.76
See application file for complete search history.

(56) References Cited

U.S. PATENT DOCUMENTS

| 5,101,665 | A | * | 4/1992 | Mizuno ........................ 73/721 |
| 5,741,975 | A | * | 4/1998 | Vaughn et al. ................ 73/706 |
| 6,536,287 | B2 | * | 3/2003 | Beekhuizen et al. .......... 73/718 |
| 2003/0033884 | A1 | * | 2/2003 | Beekhuizen et al. .......... 73/718 |
| 2011/0088480 | A1 | * | 4/2011 | Koehler et al. ............... 73/753 |

* cited by examiner

*Primary Examiner* — Freddie Kirkland, III
(74) *Attorney, Agent, or Firm* — Chapin IP Law

(57) ABSTRACT

Techniques disclosed herein include systems and methods for sensor systems for measuring pressure in an exhaust conduit of a combustion engine. The sensor system includes an electronics module assembly and a housing assembly for housing the electronics module assembly. The electronics module assembly can include several components such as sensing element carrier element with a sensing element, an electronics module carrier element carrying electronic components. Electrical connections can be provided between the electronic module carrier element and the sensing element carrier element. Another component includes a main carrier element for supporting the sensing element carrier element and the electronic module carrier element.

21 Claims, 4 Drawing Sheets

SENSOR SYSTEM FOR DIFFERENTIAL PRESSURE MEASUREMENT

CROSS REFERENCE TO RELATED APPLICATIONS

The present application claims the benefit of European Patent Application No. 11176135.9 filed Aug. 1, 2011, entitled "Sensor System For Differential Pressure Measurement," which is incorporated herein by reference in its entirety.

BACKGROUND

The present invention relates to a sensor system for measuring pressure in an exhaust conduit of a combustion engine. The sensor system herein comprises an electronics module assembly and a housing assembly for housing the electronics module assembly.

European patent application EP-A-1 521 952 discloses a pressure measuring device. The device is provided with two housing parts, of which one can be implemented as cover part. A single carrier is provided on which a (pressure) sensing element is positioned, and on which also electronic components may be positioned. The housing internally comprises three housing spaces, which are separated from each other using seals. The first and third housing spaces are in communication with a front and a back side of the sensing element, respectively. The second space accommodates bonding wires from the single carrier to contact elements of a connector integrated with the housing.

European patent application EP-A-2 184 594 discloses a pressure sensor for measuring pressure in a medium, comprising a sensor housing, and a support member on which a sensing element and further electronic components are positioned. The sensing element front and back side are protected from the environment (i.e. the medium) using a gel like protective member. The protective member is only provided in an area surrounding the sensing element, using barriers attached to the support member.

SUMMARY

Techniques disclosed herein seek to provide an improved sensor system, especially suited for automotive applications such as exhaust gas measurement.

According to techniques herein, a sensor system according to the preamble defined above is provided, wherein the electronics module assembly comprises a sensing element carrier element with a sensing element, an electronics module carrier element carrying electronic components, wherein electrical connections are provided between the electronic module carrier element and the sensing element carrier element, and a main carrier element for supporting the sensing element carrier element and the electronic module carrier element. By using these three main elements a very efficient production and assembly can be accomplished, resulting in a robust and reliable sensor system, especially when the sensing element is a differential pressure sensor, as the sensor system allows efficient and reliable access to both the front side and the back side of the sensing element.

In further embodiments, the sensing element carrier element comprises a ceramic substrate, and/or the electronics module carrier element is a printed circuit board. Furthermore, the sensing element carrier element and electronics module carrier element may be connected using wire bonding. This allows efficient production of these elements as separate parts using the most efficient associated techniques.

In an embodiment, the main carrier element supports and mutually positions the sensing element carrier element and the electronics module carrier element. Also the main carrier element may be arranged for positioning of the electronics module assembly in the housing assembly.

In an embodiment, the sensor system further comprises a front side barrier attached to the sensing element carrier element and surrounding a top side of the sensing element, wherein the sensing element carrier element comprises conducting tracks, the conducting tracks within a space defined by the front side barrier being made of gold. This allows to limit the use of costly material to as small an area as possible. Furthermore, the front side barrier may be used to accommodate a protective member, such as a gel, shielding the sensing element from e.g. exhaust gases during operation. Furthermore, the main carrier element is arranged as a back side barrier for a protective member covering the sensing element.

In a further group of embodiments, the housing assembly comprises a high pressure connection and a low pressure connection at a bottom side of the housing assembly, wherein the electronic module assembly is connected to the high pressure connection via an adhesive bond onto the front side barrier and connected to the low pressure connection via an adhesive bond onto the main carrier element. The adhesive bond may act as a seal and may be provided onto a front side barrier, which is attached to the sensing element carrier element and surrounds a top side of the sensing element and onto the main carrier element.

A high pressure channel from the high pressure connection to the front side of the sensing element, and a low pressure channel from the low pressure connection to the back side of the sensing element may be provided with internal rounded edges to ensure unrestricted access to the sensing element without risk of clogging etc, e.g. due to moisture build up. To further enhance this effect, a high pressure channel from the high pressure connection to the front side of the sensing element, and a low pressure channel from the low pressure connection to the back side of the sensing element may be provided, which comprise sloping walls having an inclination towards the bottom side of the housing assembly. To allow any moisture forming in the sensor system to drain away from the sensor system, the sensing element is positioned in a top part of the housing assembly, remote from the high pressure connection and the low pressure channel connection in a further embodiment. Also, the main carrier element may be provided with a sloping wall for a similar effect.

In a further embodiment, the electronics module assembly further comprises a front side barrier attached to the sensing element carrier element and surrounding a top side of the sensing element, the front side barrier being provided with a sealing rim and a de-watering edge at a bottom part of the front side barrier. Again, this allows proper protection of the sensing element to withstand a harsh environment as encountered in automotive applications.

The housing assembly comprises a housing assembly body, a first cover and a second cover, the first and second cover closing off a first and a second side of the housing assembly body, respectively. This allows production of the housing assembly body using e.g. well known and cost-effective injection moulding techniques, and easy assembly of the sensor system by adding the other elements and closing off the housing assembly body using the first and second cover. The first housing cover may be provided with a sloping wall which when assembled forms part of the low-pressure channel.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Pressure sensors, such as differential pressure sensors, are widely used in a broad range of applications, such as automotive applications. The present invention embodiments relate to such a sensor system, and may be advantageously used for measuring pressure in an exhaust conduit of a combustion engine.

Figure 1:
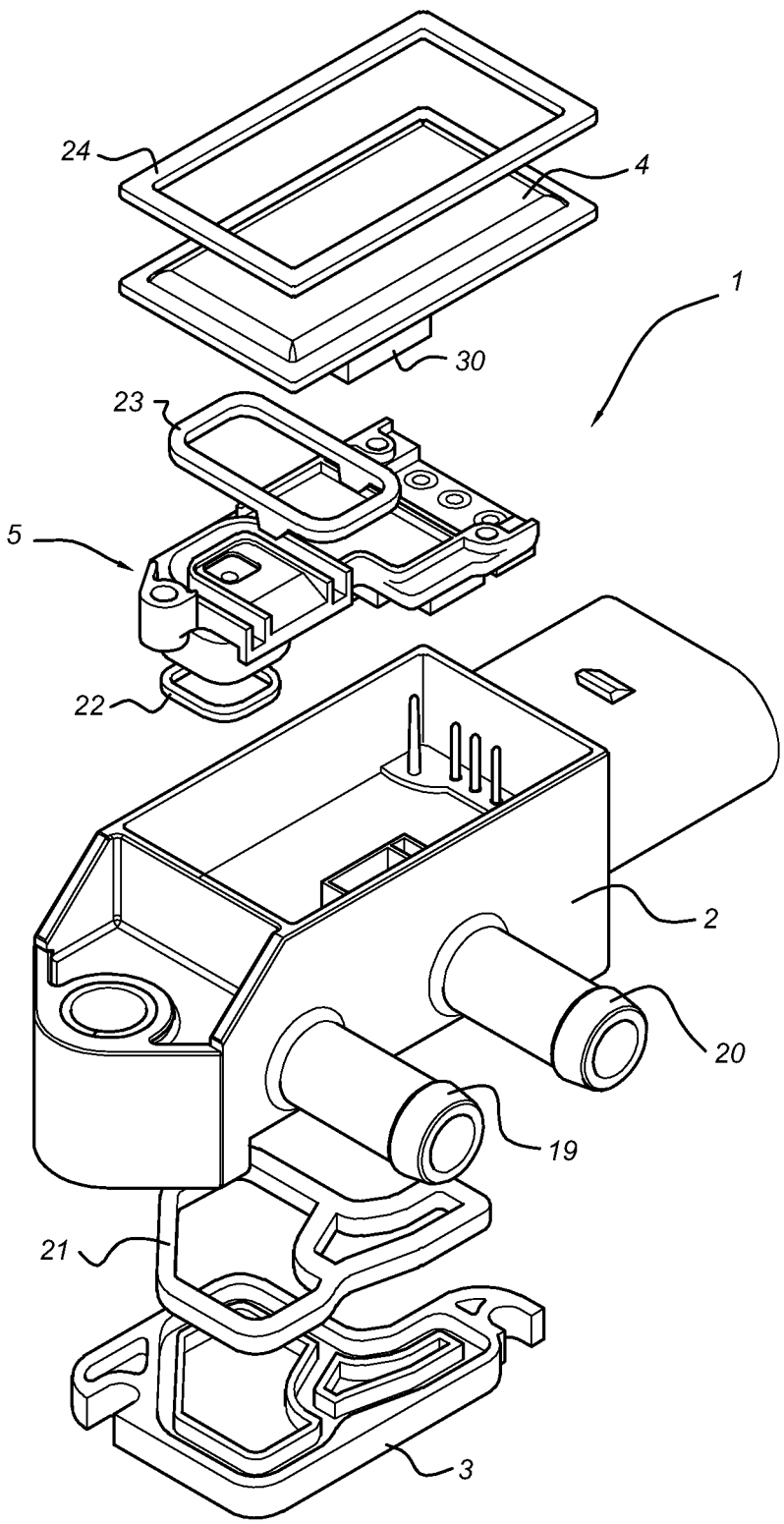
FIG. 1 shows an exploded view in perspective of the parts of a sensor system according to an embodiment of the present invention.

As shown in the exploded view in perspective of the parts of a sensor system according to an embodiment of the present invention in FIG. 1, the sensor system 1 comprises an electronics module assembly (EMA) 5 and a housing assembly 2-4 for housing the electronics module assembly 5. The housing assembly comprises a housing assembly body 2, a first cover 3 for covering a first side of the housing assembly body 2, and a second cover 4 for covering a second side of the housing assembly body 2. The sensor assembly is further provided with a high pressure connection 19 and a low pressure connection 20. Various parts of the sensor assembly 1 are attached to each other with seals in between, such as a seal 21 between the first cover 3 and the housing assembly body 2, a seal 22 between housing assembly body 2 and electronics module assembly 5, and a seal 23 between electronics module assembly 5 and second cover 4. The second cover 4 is furthermore attached to the housing assembly body 2 using an external seal 24.

Using a housing assembly body 2 with two opposing opening faces which are closed off by the first and second cover 3, 4, allows to manufacture the housing assembly body with its internal features efficiently.

Figure 2:
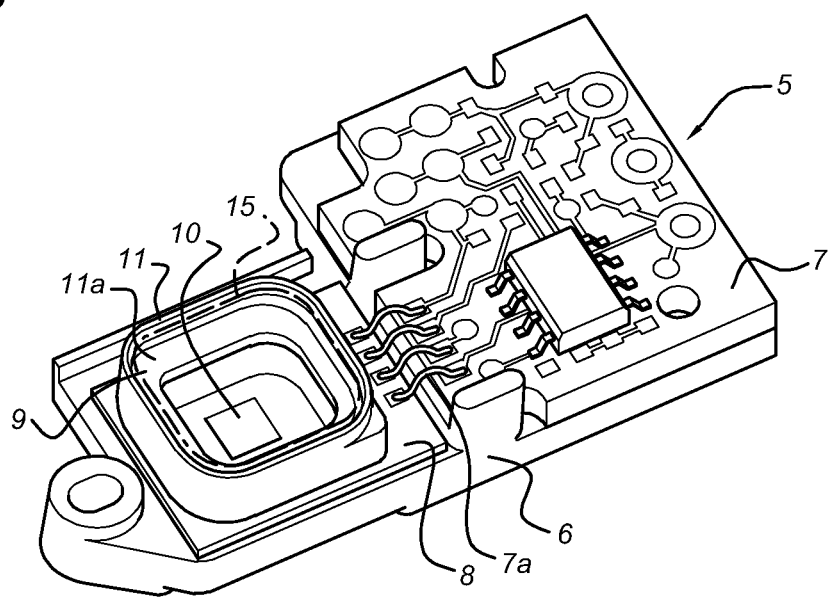
FIG. 2 shows a top view in perspective of an electronics module assembly as used in an embodiment of the sensor system according to the present invention.
Figure 3:
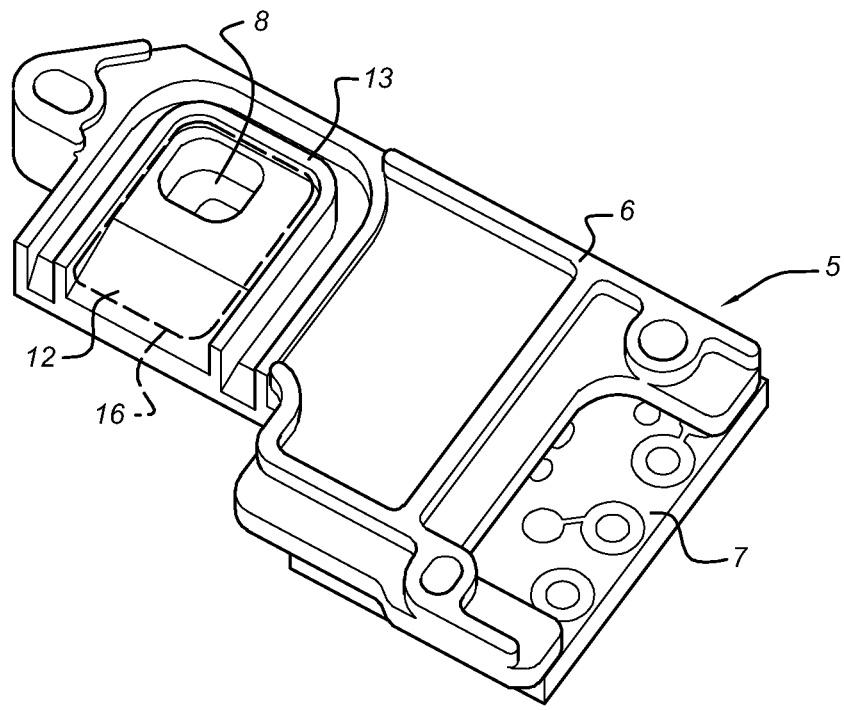
FIG. 3 shows a bottom view in perspective of the electronics module assembly of FIG. 2.

FIGS. 2 and 3 show a top and bottom view in perspective of an electronics module assembly 5 as used in an embodiment of the sensor system according to the present invention. The electronics module assembly 5 comprises a sensing element carrier element 8 (e.g. a ceramic board) with a sensing element 10, e.g. a MEMS pressure transducer. Furthermore, an electronics module carrier element 7 is provided carrying electronic components. Electrical connections 7a are provided between the electronic module carrier element 7 and the sensing element carrier element 8. A main carrier element 6 is provided for supporting the sensing element carrier element 8 and the electronic module carrier element 7. In further embodiments, the sensing element carrier element 8 comprises a ceramic substrate and/or the electronics module carrier element 8 is a printed circuit board. The combination of main carrier element 6, electronics module carrier element 7 and sensing element carrier element 8, together forming the EMA 5, allows also to handle the EMA as a stand alone unit, e.g. allowing for calibration on the level of the EMA 5 in production.

It might seem that replacing the single piece support element holding the actual sensing element of prior art pressure sensors (see e.g. European patent application EPA-2 184 594), by a number of elements in combination is counterintuitive when trying to obtain a more cost-effective sensor. However by optimizing the material choice of the components of EMA 5 to match the environments they are exposed to the design of the present invention achieves a significant cost benefit compared to prior art pressure sensors. E.g. The sensing element carrier element 8 can be made as small as to only extend to the area needed in pressure chambers of the sensing system 1.the smaller dimensions of the sensing element, resulting in much lower production cost.

The sensing element carrier element 8 is provided with an opening 14, to allow using a differential pressure sensing element 10. The sensing element 10 is positioned in front of the opening 14, while sufficient sealing is provided to ensure no leakage from the front side of the sensing element 10 to the back side. In combination with the main carrier element 6, the opening 14 in the sensing element carrier element 8 allows to have an integrated back side gel dam, allowing a bigger volume of gel to be applied on the back side of sensing element 10 (for protection against the exhaust gases).

Figure 4:
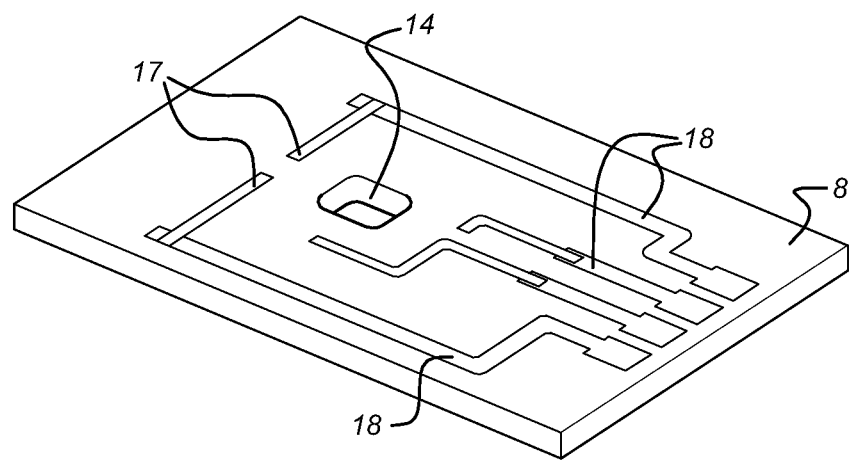
FIG. 4 shows a perspective view of a sensing element carrier element as used in the electronics module assembly of FIGS. 2 and 3.

The sensing element carrier element 8 is in a further embodiment provided with a front side barrier 9 attached to the sensing element carrier element 8 and surrounding a top side of the sensing element 10. This allows providing a gel or other protective member on top of the sensing element 10, protecting it from the environment (such as diesel exhaust gases). Furthermore, the main carrier element 6 is arranged as a back side barrier for a protective member covering the sensing element 10 on the other side. As shown in the perspective view of FIG. 4, the sensing element carrier element 8 comprises conducting tracks 17, 18. The conducting tracks 17 which are within a space defined by the front side barrier 9 are made of gold, which can resist the possible aggressive environment in that space. The further tracks 18, which runs outside of the front side barrier 9 can be made of less resistant material, such as AgPd. By using as little as possible of the expensive Au material for the tracks 17 (only at least the parts within the front side barrier 9), cost can be even further reduced.

In the embodiments shown in FIGS. 2 and 3, the conditioning electronics needed for the sensor system 1 can be easily integrated onto the electronics module carrier element (e.g. a PCB) 7 using standard manufacturing techniques. In an embodiment, the sensing element carrier element 8 and electronics module carrier element 7 are connected using wire bonding, i.e. the electrical connections 7a are provided by wire bonds between bonding pads provided on each of the sensing element carrier element 8 and electronics module carrier element 7. This technique is widely used and can be applied very efficiently.

In a further embodiment, the main carrier element 6 and the housing assembly 5 are made of plastic material suited for automotive applications. The main carrier element 6 supports and mutually positions the sensing element carrier element 8 and the electronics module carrier element 7, e.g. using guiding rims or other extensions. Furthermore, the main carrier element 6 positions of the electronics module assembly 5 in the housing assembly 2.

Figure 5:
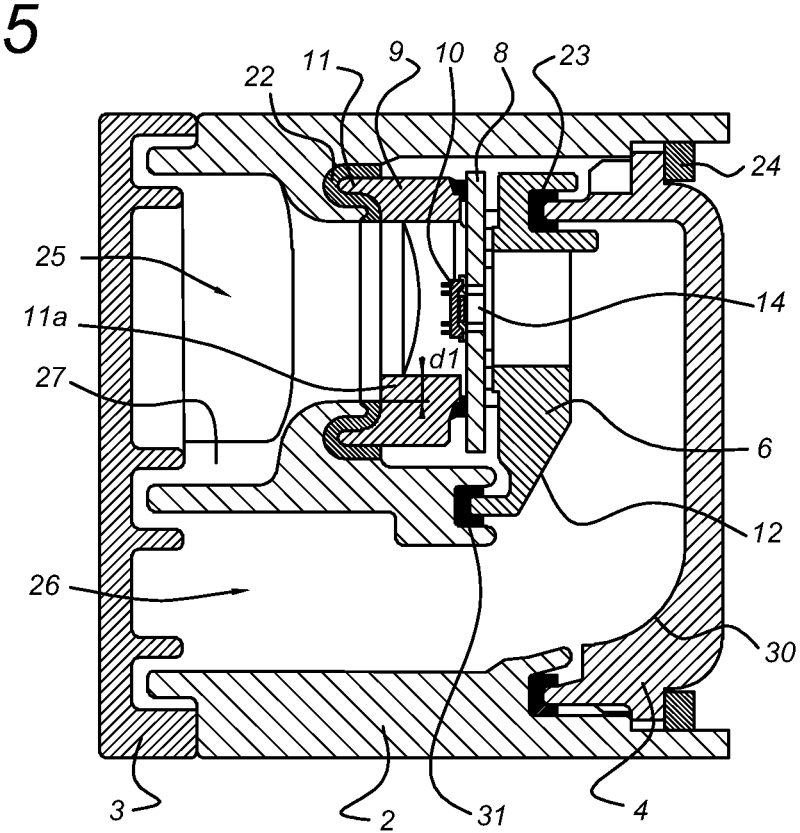
FIG. 5 shows a cross sectional view of a sensor system according to an embodiment of the present invention.

FIG. 5 shows a cross sectional view of an embodiment of the sensor system 1 according to the present invention. It is clearly shown that the sensor housing comprises three parts, i.e. the sensor housing body 2, first cover 3 and second cover 4. The first and second cover 3, 4, close off the opposing open spaces of the housing assembly body 2. As shown in FIG. 5, the various parts are provided with tongue and groove features, allowing a very good sealing of the various parts (using seals 21-23, see FIG. 1 as described above, and seal 31 between main carrier element 6 and the sensor housing body 2). Using such tongue and groove seals, the position and amount of sealant can be much better controlled. Stand offs and protrusions as these tongue and groove seals are also advantageous to control and minimize the variation of glue thickness for robustness of electronics module assembly 5 with the wire bond interconnects 7a. Also, the environmental seal 24 for attaching the second cover 4 to the housing assembly body 2 is clearly shown. In FIG. 5, the first cover 3 is shown in position, i.e. in contact with the housing assembly body 2, but without the seal 21 (see FIG. 1).

Thus in a specific embodiment, the electronic module assembly 5 is connected to the high pressure connection 19 and low pressure connection 20 via an adhesive bond (or sealant) onto the front side barrier 9 (seal 32 and rim 9) and the main carrier element 6 (seals 23, 31, and associated protrusions in main carrier element 6).

Figure 6:
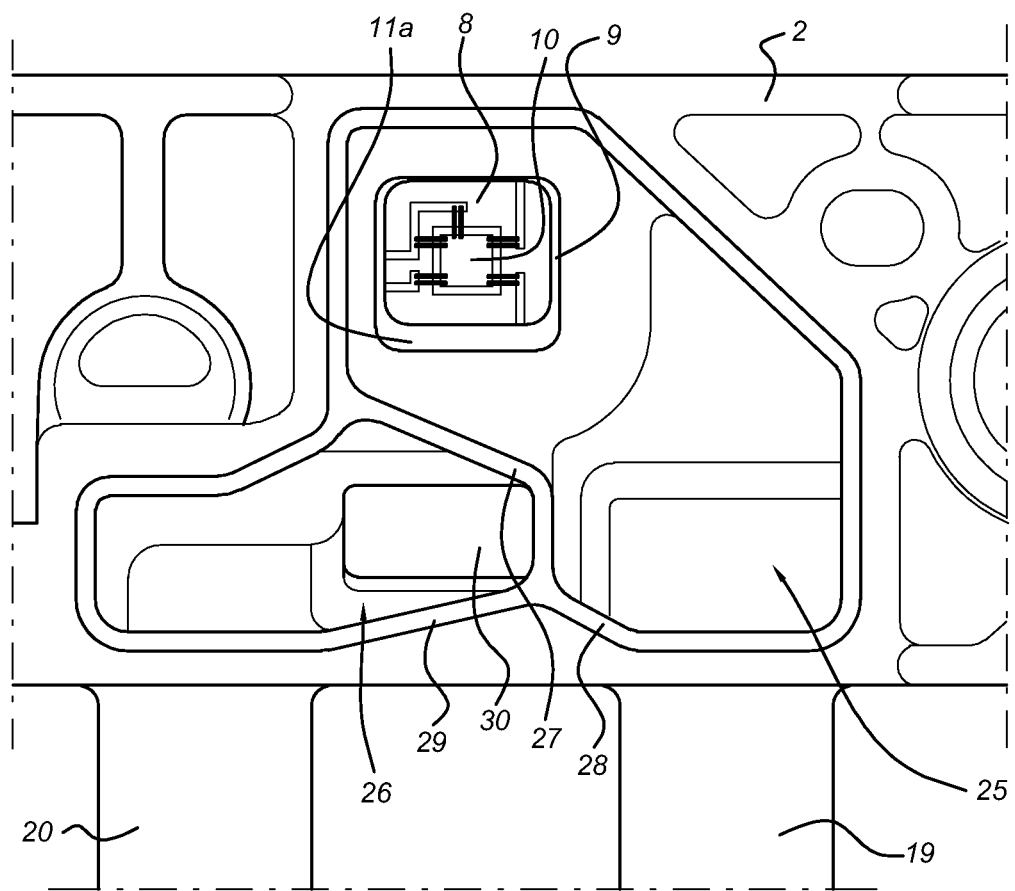
FIG. 6 shows a side view of a part of the sensor system according to a present invention embodiment.

The EMA 5 is shown in FIG. 5 in cross section where the sensing element carrier element 8 is attached to the main carrier element 6, i.e. where the sensing element 10 is positioned in front of the opening 14, and thus is in communication with a high pressure chamber (or channel 25) and a low pressure chamber (or channel) 26. FIG. 6 shows a side view of a part of the sensor system 1 according to a present invention embodiment, and shows that the high pressure chamber 25 is in communication with the high pressure connection 19, and that the low pressure chamber 26 is in communication with the low pressure connection 20 (see also FIG. 1).

Prior art pressure sensors, particular in automotive applications involving exhaust gases, tend to be sensitive to possible build up of condensing fluid inside the pressure sensors. This can be the cause of malfunction of the sensor assembly 1, e.g. by resulting in a short circuit, corrosion or clogging (e.g. build up of ice under certain conditions). According to the present invention embodiments, a number of technical features are provided which eliminate this problem to a high degree. It is noted that the features described herein to address the drainage improvements are related to gravity related features, i.e. the condensate build-up inside the sensor system 1 is able to flow out of the sensor system 1 after power down under the influence of gravity alone. The features can be applied stand alone as well, i.e. a sensor system 1 may be provided with the features now described in claims 8-15.

The ability of a sensor system to quickly allow the fluid to flow out of the sensor system after power down is important to avoid loss of a sensor (pressure) signal in cold conditions, e.g. due to ice blocking the pressure tubes and chambers 25, 26. Furthermore, the sensor system 1 robustness against acidic exhaust gas environment is improved. When the water content of the exhaust condensate evaporates after power down of the engine, the pH values quickly drop to extreme low values. Self draining of the sensor system 1 takes care of removal of the condensate even before this can occur.

In an embodiment, the housing assembly comprises a high pressure connection 19 and a low pressure connection 20 at a bottom side of the housing assembly body 2, the high pressure connection 19 and the low pressure connection 20 having a sufficiently large inner diameter, e.g. of at least 5 mm. Also internally of the housing assembly (housing assembly body 2, first cover 3 and second cover 4), the high and low pressure channels (ending up or being part of the high and low pressure chambers 25, 26, respectively) are also as wide as possible, e.g. having a minimum cross sectional dimension of e.g. 5 mm. In a specific embodiment, the housing assembly 2-4 provides a void of at least 5 mm at the front and back side of the sensing element 10, when assembled.

In a further embodiment, the high pressure chamber 25 from the high pressure connection 19 to the front side of the sensing element 10, and the low pressure chamber 26 from the low pressure connection 20 to the back side of the sensing element 10 are provided with internal rounded edges, e.g. having a curvature of at least 1 mm radius. Also the high and low pressure chambers 25, 26 inside the housing assembly body 2 may be provided with sloping walls 27-29, having an inclination towards the bottom side of the housing assembly body 2. The sloping walls 27, 28 are in the high pressure chamber 25, and the sloping wall 29 and rounded, sloping wall 30 (which is part of the second cover 4) are part of the low pressure chamber 26. In an even further embodiment, also the main carrier element 6 is provided with a sloping wall 12 (see FIG. 3) as part of the low pressure chamber 26, effectively routing condensate towards the low pressure connection 20. These features apart or in combination provide an efficient pathway for condensate to leave the sensor system 1 via the connections 19, 20, effectively preventing the build up of condensate inside the sensor system 1. Also, no sharp edged spaces or small passages are present, where condensate can accumulate and stay for elongated periods.

In the embodiments shown in the FIGS. 1-6 the sensing element 10 is furthermore positioned in a top part of the housing assembly body 2, remote from the high pressure connection 19 and the low pressure connection 20. This effectively helps in keeping any moisture or condensate away from the sensitive surface of the sensing element 10.

As shown in the cross sectional view of FIG. 5, the EMA 5 further comprising a front side barrier 9 attached to the sensing element carrier element 8 and surrounding a top side of the sensing element 10. The front side barrier 9 is provided with a sealing rim 11 (see also FIG. 2) and a de-watering edge 11a at a bottom part of the front side barrier 9, i.e. the front side barrier 9 is asymmetric. This results in an upward edge having a width dl in the high pressure chamber 25 from the housing assembly body 2 towards the sensing element carrier element 8, again increasing the resistance against moisture/condensate building up near the sensitive surface of the sensing element 10, and an easy pathway for the condensate towards the high pressure connection 19.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A sensor system for measuring pressure in an exhaust conduit of a combustion engine, the sensor system comprising:
   an electronics module assembly;
   a housing assembly for housing the electronics module assembly; the electronics module assembly comprises:
   a sensing element carrier element with a sensing element;
   an electronics module carrier element carrying electronic components, wherein electrical connections are provided between the electronic module carrier element and the sensing element carrier element; and
   a main carrier element for supporting the sensing element carrier element and the electronic module carrier element
   wherein the sensor system is configured for self-draining of condensate.

2. The sensor system according to claim 1, wherein the sensing element carrier element comprises a ceramic substrate.

3. The sensor system according to claim 1, wherein the electronics module carrier element is a printed circuit board.

4. The sensor system according to claim 1, wherein the sensing element carrier element and electronics module carrier element are connected using wire bonding.

5. The sensor system according to claim 1, wherein the main carrier element supports and mutually positions the sensing element carrier element and the electronics module carrier element.

6. The sensor system according to claim 1, further comprising a front side barrier attached to the sensing element carrier element and surrounding a top side of the sensing element, wherein the sensing element carrier element comprises conducting tracks, the conducting tracks within a space defined by the front side barrier and being made of gold.

7. The sensor system according to claim 1, wherein the main carrier element is arranged as a back side barrier for a protective member covering the sensing element.

8. The sensor system according to claim 1, wherein the housing assembly comprises a high pressure connection and a low pressure connection at a bottom side of the housing assembly, and wherein the electronic module assembly is connected to the high pressure connection via an adhesive bond onto a front side barrier attached to the sensing element carrier element and connected to the low pressure connection via an adhesive bond onto the main carrier element.

9. The sensor system according to claim 8, wherein a high pressure channel from the high pressure connection to the front side of the sensing element, and a low pressure channel from the low pressure connection to the back side of the sensing element are provided with internal rounded edges.

10. The sensor system according to claim 8, wherein a high pressure channel from the high pressure connection to the front side of the sensing element, and a low pressure channel from the low pressure connection to the back side of the sensing element are provided, which comprise sloping walls having an inclination towards the bottom side of the housing assembly.

11. The sensor system according to claim 8, wherein the sensing element is positioned in a top part of the housing assembly, remote from the high pressure connection and the low pressure channel connection.

12. The sensor system according to claim 8, wherein the main carrier element is provided with a sloping wall.

13. The sensor system according to claim 8, the electronics module assembly further comprising a front side barrier attached to the sensing element carrier element and surrounding a top side of the sensing element, the front side barrier being provided with a sealing rim and a de-watering edge at a bottom part of the front side barrier.

14. The sensor system according to claim 1, wherein the housing assembly comprises a housing assembly body, a first cover and a second cover, the first cover and the second cover closing off a first and a second side of the housing assembly body respectively.

15. The sensor system according to claim 14, wherein the first housing cover is provided with a sloping wall which when assembled forms part of low pressure channel.

16. The sensor system of claim 1, wherein the sensing element carrier element comprises a ceramic substrate; wherein the electronics module carrier element is a printed circuit board; and wherein the sensing element carrier element and electronics module carrier element are connected using wire bonding.

17. The sensor system of claim 16, further comprising:
   wherein the main carrier element supports and mutually positions the sensing element carrier element and the electronics module carrier element:
   a front side barrier attached to the sensing element carrier element and surrounding a top side of the sensing element, wherein the sensing element carrier element comprises conducting tracks, the conducting tracks being within a space defined by the front side barrier and being made of gold; and
   wherein the main carrier element is arranged as a back side barrier for a protective member covering the sensing element.

18. The sensor system of claim 17, wherein the housing assembly comprises a high pressure connection and a low pressure connection at a bottom side of the housing assembly, wherein the electronic module assembly is connected to the high pressure connection via an adhesive bond onto a front side barrier attached to the sensing element carrier element and connected to the low pressure connection via an adhesive bond onto the main carrier element, wherein a high pressure channel from the high pressure connection to the front side of the sensing element, and a low pressure channel from the low pressure connection to the back side of the sensing element are provided with internal rounded edges; and wherein a high pressure channel from the high pressure connection to the front side of the sensing element, and a low pressure channel from the low pressure connection to the back side of the sensing element are provided and comprise sloping walls having an inclination towards the bottom side of the housing assembly.

19. The sensor system of claim 18, wherein the sensing element is positioned in a top part of the housing assembly, remote from the high pressure connection and the low pressure channel connection; wherein the main carrier element is provided with a sloping wall; and wherein the electronics module assembly further comprises:

a front side barrier attached to the sensing element carrier element and surrounding a top side of the sensing element, the front side barrier being provided with a sealing rim and a de-watering edge at a bottom part of the front side barrier.

20. The sensor system of claim 19, wherein the housing assembly comprises a housing assembly body, a first cover and a second cover, the first and second cover closing off a first and a second side of the housing assembly body respectively; and wherein the first housing cover is provided with a sloping wall which when assembled forms part of the low pressure channel.

21. A sensor system for measuring pressure in an exhaust conduit of a combustion engine, the sensor system comprising:
- a housing assembly comprising an electronics module assembly, that comprises a sensing element carrier element with a sensing element;
- an electronics module carrier element carrying electronic components, wherein electrical connections are provided between the electronic module carrier element and the sensing element carrier element; and a main carrier element for supporting the sensing element carrier element and the electronic module carrier element;
- wherein the sensor system is configured for self-draining of condensate after power down.

* * * * *